US012663063B2

(12) United States Patent
Hirota et al.

(10) Patent No.: US 12,663,063 B2
(45) Date of Patent: Jun. 23, 2026

(54) DIFFERENTIAL APPARATUS

(71) Applicant: GKN Automotive Limited, Birmingham (GB)

(72) Inventors: Isao Hirota, Tochigi (JP); Kazutaka Kawata, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 19/264,086

(22) Filed: Jul. 9, 2025

(65) Prior Publication Data

US 2026/0016074 A1     Jan. 15, 2026

(30) Foreign Application Priority Data

Jul. 11, 2024     (JP) ................................. 2024-111544

(51) Int. Cl.
*F16H 48/10*         (2012.01)
*F16H 48/40*         (2012.01)
*F16H 57/12*         (2006.01)

(52) U.S. Cl.
CPC ............. *F16H 48/10* (2013.01); *F16H 48/40* (2013.01); *F16H 57/12* (2013.01); *F16H 2057/127* (2013.01)

(58) Field of Classification Search
CPC ........................... F16H 48/08; F16H 2057/127
See application file for complete search history.

(56) References Cited

U.S. PATENT DOCUMENTS

| | | | | |
|---|---|---|---|---|
| 1,445,865 A * | 2/1923 | Alden | ..................... | F16H 48/08 |
| | | | | 475/228 |
| 6,470,988 B1 * | 10/2002 | Beesley | .................. | F16H 48/08 |
| | | | | 180/245 |
| 10,781,904 B2 * | 9/2020 | Hirota | ..................... | F16H 48/14 |
| 2013/0116080 A1 * | 5/2013 | Yoshimura | .............. | F16H 48/08 |
| | | | | 475/230 |

FOREIGN PATENT DOCUMENTS

| JP | S48004258 B | 2/1973 |
|---|---|---|
| JP | H10246308 A | 9/1998 |
| JP | 2011-247300 A | 12/2011 |

OTHER PUBLICATIONS

JP Office Action for JP Application No. 2024-111544 dated Nov. 4, 2025 (11 pages).

* cited by examiner

*Primary Examiner* — Huan Le
(74) *Attorney, Agent, or Firm* — Reising Ethington P.C.

(57)         ABSTRACT

A differential apparatus includes a differential case, a pinion gear that is rotatably supported in the differential case and revolves as the differential case rotates, and side gears that respectively mesh with the pinion gear. The side gears are relatively rotatable with each other. A first planar portion orthogonal to a rotation axis is provided on a back side each of the side gears. A second planar portion which can abut against the first planar portion is provided in the differential case. A first abutment force is applied between the first planar portion and the second planar portion by a biasing member. A meshing reaction force between the pinion gear and the side gear applies a second abutment force between the first planar portion and the second planar portion.

16 Claims, 5 Drawing Sheets

DIFFERENTIAL APPARATUS

CROSS REFERENCE TO RELATED APPLICATIONS

This application is based on and claims priority under 35 USC 119 from Japanese Patent Application No. 2024-111544 filed on Jul. 11, 2024, the entire content of which is incorporated herein by reference.

TECHNICAL FIELD

The present disclosure relates to a differential apparatus.

BACKGROUND

In the related art, a differential apparatus includes a differential case that is rotatably disposed and a pinion gear that is rotatably supported in the differential case and revolves as the differential case rotates. Patent Literature 1, JP2011-247300A, discloses a differential apparatus provided with a pair of side gears that respectively mesh with a pinion gear and that are relatively rotatable to each other. In the differential apparatus, the pinion gear and each of the side gears are bevel gear sets. A pressing member formed of a conical spring washer is disposed axially between the differential case and the side gear.

The pressing member presses the side gear toward the pinion gear such that backlash between the side gear and the pinion gear is zero. Therefore, each time teeth of the side gear that mesh with the pinion gear alternate one by one, the side gears reciprocate in a rotation axis direction and slightly vibrates in the rotation axis direction. The minute vibration of the side gear is transmitted to a tire, and the minute vibration is applied in a width direction of the tire. The tire to which the minute vibration is applied has an increased friction coefficient in a rotation direction with respect to the road surface, and the idling of the tire is prevented.

According to the differential apparatus of Patent Literature 1, if a biasing force of the pressing member, that is, an initial torque is increased, a range of a differential limiting characteristic can be expanded, but the traveling resistance of left and right wheels increases, making it difficult for a vehicle to turn and reducing turning performance.

SUMMARY

Embodiments relate to a differential apparatus capable of improving off-road performance while maintaining turning performance.

According to embodiments, a differential apparatus includes a differential case that is rotatably disposed, a pinion gear that is rotatably supported in the differential case and revolves as the differential case rotates, and a pair of side gears that respectively mesh with the pinion gear. The side gears are relatively rotatable with each other. The pinion gear and the side gears are bevel gear sets. A first planar portion orthogonal to a rotation axis is provided on a back surface side of a gear portion of each of the side gears. A second planar portion orthogonal to the rotation axis and disposed to face the first planar portion so as to be able to abut against the first planar portion is provided in the differential case. A first abutment force is applied between the first planar portion and the second planar portion by a biasing member. A meshing reaction force between the pinion gear and the side gear applies a second abutment force between the first planar portion and the second planar portion.

According to embodiments, a differential apparatus is capable of improving off-road performance while maintaining turning performance.

BRIEF DESCRIPTION OF DRAWINGS

The following detailed description of certain embodiments and best mode will be set forth with reference to the accompanying drawings, in which.

DETAILED DESCRIPTION

Figure 1:
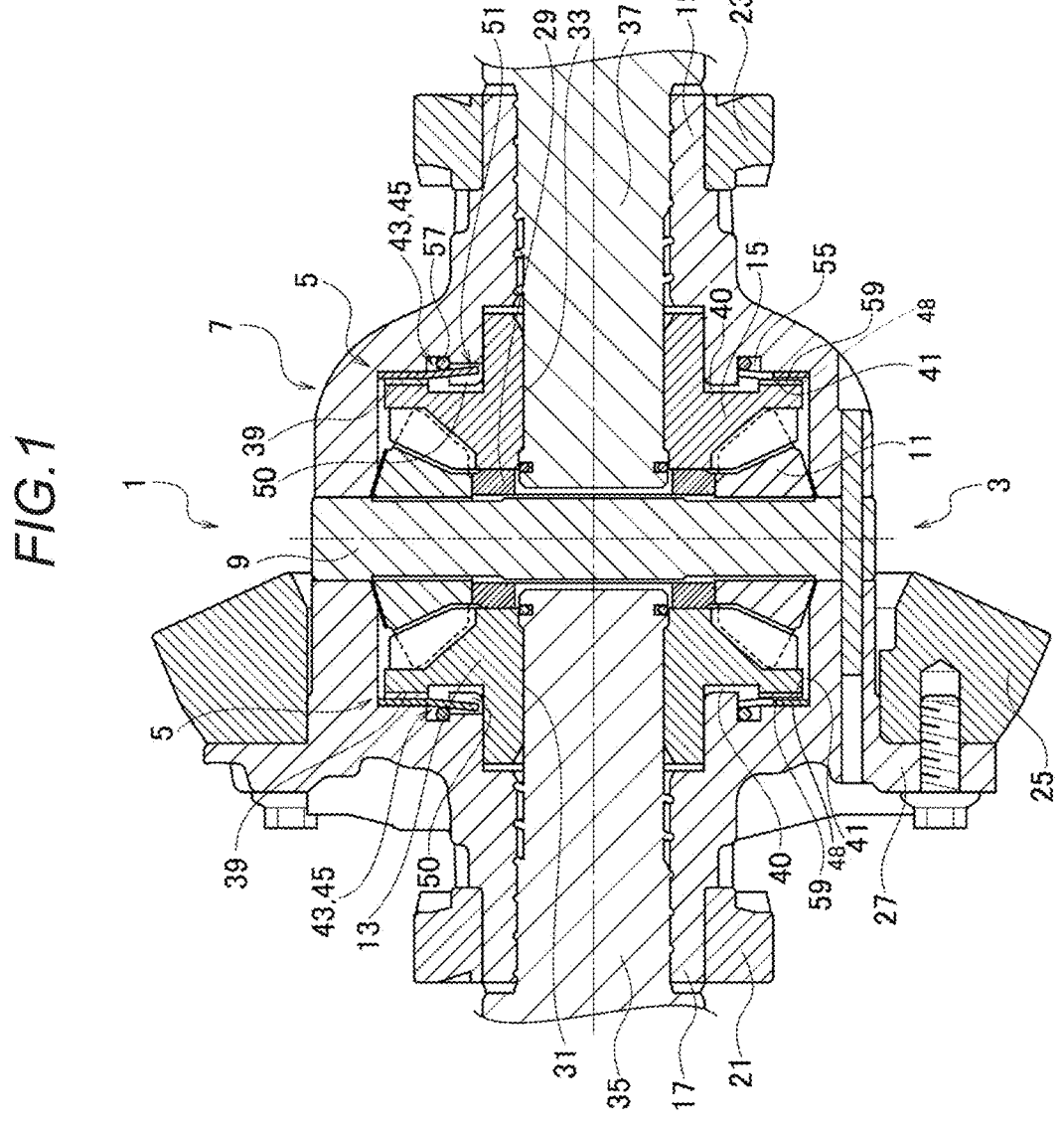
FIG. 1 is a cross-sectional view of a differential apparatus according to a first embodiment.

Differential apparatuses according to embodiments will be described in detail with reference to the drawings. Dimensional ratios in the drawings may be exaggerated for a convenience of description and different from the actual ratios.

First Embodiment

A first embodiment will be described with reference to FIGS. 1 to 3.

As illustrated in FIG. 1, a differential apparatus 1 according to the present embodiment is arranged, for example, between a driving source (not illustrated) such as an engine or an electric motor and left and right wheels (not illustrated). The driving force from the driving source is transmitted to the differential apparatus 1 via a transmission (not illustrated), and the driving force is distributed to the left and right wheels (not illustrated) via a pair of output shafts.

Figure 2:
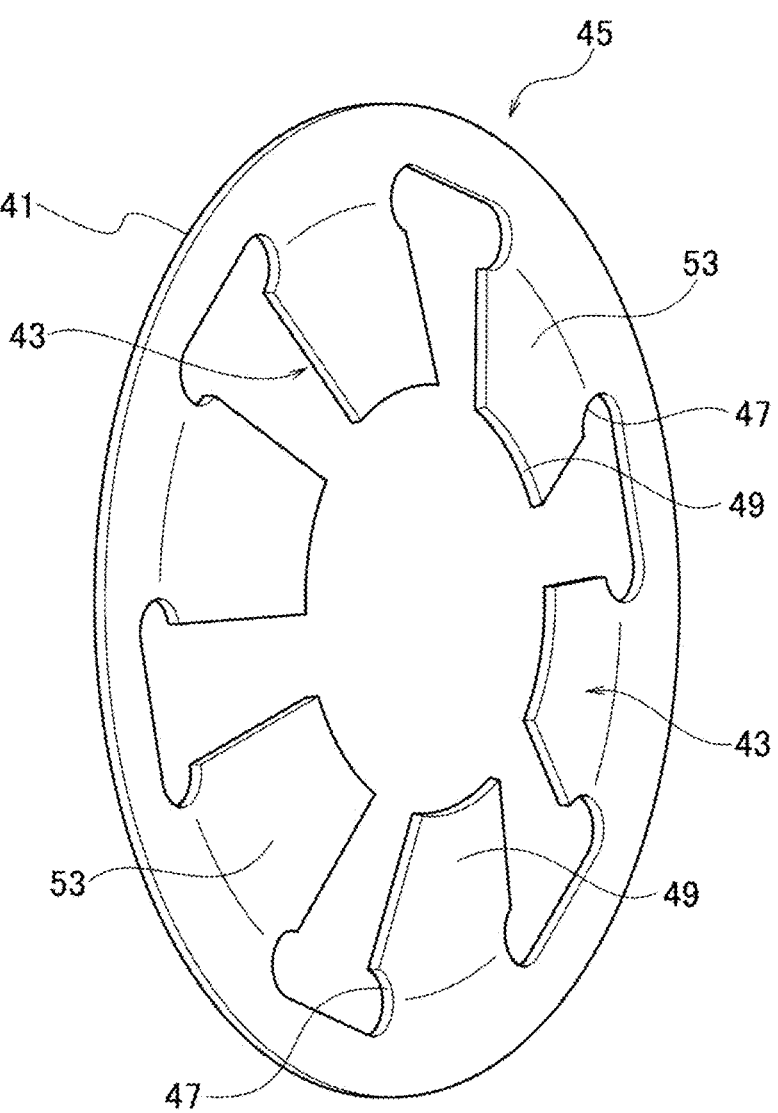
FIG. 2 is a perspective view of a biasing member and a plate of the differential apparatus according to the first embodiment.

As illustrated in FIGS. 1 and 2, the differential apparatus 1 includes a differential mechanism 3 and differential limiting portions 5.

The differential mechanism 3 includes a differential case 7, a pinion shaft 9, a pinion gear 11, and a pair of side gears 13, 15.

The differential case 7 is rotatably supported by a stationary member (not illustrated) such as a carrier via bearings 21, 23 on outer peripheries of boss portions 17, 19 formed on both sides in an axial direction. The differential case 7 is formed with a flange portion 27 to which a ring gear 25 is fixed. The ring gear 25 meshes with a power transmission gear (not illustrated) that transmits a driving force, and the driving force is transmitted to rotationally drive the differential case 7. The pinion shaft 9, the pinion gear 11, the pair of side gears 13, 15, and another members are accommodated and disposed in the differential case 7.

The pinion shaft 9 has an end portion which is engaged with a hole formed in the differential case 7 so as to be retained and prevented from rotating by a pin, and is rotationally driven integrally with the differential case 7. The pinion shaft 9 is accommodated in a block member 29 that fixes axial positions of the pair of side gears 13, 15 such that both axial end portions of the pinion shaft 9 are exposed to the outside. The pinion gears 11 are supported on both axial end sides of the pinion shaft 9.

A plurality of (here, two) pinion gears 11 are disposed at equal intervals in a circumferential direction of the differential case 7. The plurality of pinion gears 11 are supported on end portion sides of the pinion shaft 9, respectively, and revolve as the differential case 7 rotates. The pinion gear 11 is rotatably supported by the pinion shaft 9 so as to be rotationally driven when a differential rotation occurs between the pair of side gears 13, 15 respectively meshing with the pinion gear 11. The pinion gear 11 transmits the driving force input to the differential case 7 to the pair of side gears 13, 15.

The pair of side gears 13, 15 are accommodated in the differential case 7 so as to be relatively rotatable to each other. The pair of side gears 13, 15 mesh with the pinion gear 11, respectively. The pinion gear 11 and the pair of side gears 13, 15 constitute bevel gear sets. Spline-shaped output portions 31, 33 that output the driving force transmitted to the pair of side gears 13, 15 are provided on inner peripheral sides of the pair of side gears 13, 15. A pair of output shafts 35, 37 integrally rotatably connected to the left and right wheels are integrally rotatably connected to the output portions 31, 33.

The differential limiting portions 5 are disposed between the differential case 7 and the respective side gears 13, 15. Each of the differential limiting portions 5 includes a first planar portion 39 and a second planar portion 41 that slide against each other, and a biasing member 43.

The first planar portion 39 is provided on back surface sides of gear portions of the side gears 13, 15. The first planar portion 39 extends in a planar direction orthogonal to rotation axes of the side gears 13, 15. The first planar portion 39 is disposed so as to be able to abut against the second planar portion 41 in a rotation axis direction. The first planar portion 39 has, on an inner diameter side of an inner end portion thereof, a recess 40 recessed toward the pinion gear 11 so as to be separated from the second planar portion 41 in the axial direction. Therefore, the inner diameter side of the inner end portion of the first planar portion 39 does not slide against the second planar portion 41, and a differential limiting characteristic of the differential limiting portion 5 is not affected.

The second planar portion 41 is provided on a plate 45 disposed to be rotatable integrally with the differential case 7. The second planar portion 41 is formed or disposed so as to rotate in conjunction with the differential case 7 either directly or indirectly, and abuts against the first planar portion 39 so as to rotate relative to the first planar portion 39. By providing the second planar portion 41 on the plate 45, the second planar portion 41 can be designed independently of the design of the differential case 7. The plate 45 is formed in an annular shape so as to have openings 47 penetrating therethrough in the rotation axis direction. By providing the openings 47 in the plate 45, a lubricating oil can be easily supplied to the second planar portion 41, and lubrication can be improved. The second planar portion 41 is an annular portion of the plate 45, and is disposed to face the first planar portion 39 so as to be able to abut against the first planar portion 39 in the rotation axis direction. The second planar portion 41 extends in a planar direction orthogonal to a rotation axis of the differential case 7 so as to be parallel to the first planar portion 39.

The plate 45 is provided with a plurality of (here, six) engaging protrusions 49 that are disposed at equal intervals in a circumferential direction of the second planar portion 41 and protrude from the second planar portion 41 toward the inner diameter side. The engaging protrusions 49 are engaged with a plurality of (here, six) engaging recesses 50 formed in the differential case 7. The engaging protrusions 49 and the engaging recesses 50 form a connecting portion 51, which allows the plate 45 to rotate integrally with the differential case 7. The connecting portion 51 is disposed on the inner diameter side of the first planar portion 39 and the second planar portion 41. Therefore, the connecting portion 51 does not protrude outward in a radial direction, and the differential case 7 can be downsized in the radial direction. The pinion gear 11, the pair of side gears 13, 15, the block member 29, and the plate 45 are assembled into the differential case 7 from a peripheral wall (not illustrated) of the differential case 7.

The biasing members 43 are continuous with the plate 45 and the plate 45 and the biasing members 43 are formed as a single component. A plurality of (here, six) biasing members 43 are provided as elastic portions on the plate 45 at a portion that connects the second planar portion 41 and each of the engaging protrusions 49. Pressing forces by these elastic portions act as a whole to exert a biasing force of the biasing member 43. The biasing member 43 is inclined such that a pressing portion 53 connected to the second planar portion 41 is located closer to the pinion gear 11 than the engaging protrusion 49 in the rotation axis direction. The pressing portion 53 of the biasing member 43 is disposed on an outer diameter side of the connecting portion 51 when the plate 45 is disposed in the differential case 7. When the plate 45 is disposed in the differential case 7, the biasing member 43 abuts against an annular fulcrum member 57 accommodated in an accommodation groove 55 formed continuously in the circumferential direction on the outer diameter side of the connecting portion 51 of the differential case 7. The fulcrum member 57 is prevented from rotating at a plurality of locations in the circumferential direction in the accommodation groove 55. However, the annular fulcrum member 57 is not essential, and an axial end portion on an inner diameter side of the plate 45 and an axial end portion of the engaging recess 50 formed in the differential case 7 may abut against each other to receive a reaction force of the biasing force.

The biasing member 43 applies a first abutment force with which the second planar portion 41 presses the first planar portion 39, with an abutment portion with the fulcrum member 57 as a fulcrum. The first abutment force of the biasing member 43 causes the first planar portion 39 and the second planar portion 41 to abut against each other, generates frictional resistance with respect to the differential limiting portion 5, and applies an initial torque. By applying the initial torque to the differential limiting portion 5, the differential limiting characteristic can be stabilized. The first abutment force of the biasing member 43 is input to the block member 29 disposed between the pair of side gears 13, 15. Since the first abutment force of the biasing member 43 is received by the block member 29, backlash in the pinion gear 11 and the gear portions of the side gears 13, 15 can be ensured.

The first planar portion 39 and the second planar portion 41 in the differential limiting portion 5 are applied with a second abutment force from the pair of side gears 13, 15 moved in the axial direction by receiving a meshing reaction force with the pinion gear 11, according to the magnitude of the driving force (driving torque) input to the differential case 7. When the second abutment force is applied to the first planar portion 39 and the second planar portion 41, the first planar portion 39 and the second planar portion 41 slide against each other, and the differential limiting portion 5 limits the differential of the differential mechanism 3. The differential limiting portion 5 described above constitutes a torque-sensitive friction clutch.

Here, in a differential apparatus of the related art, the side gears 13, 15 are biased toward the pinion gear 11 by a biasing member, and backlash in the pinion gear 11 and the gear portions of the side gears 13, 15 is set to 0. Therefore, each time teeth of the side gears 13, 15 that mesh with the pinion gear 11 alternate one by one, the side gears 13, 15 reciprocate in the rotation axis direction and slightly vibrates in the rotation axis direction. The minute vibration of the side gears 13, 15 is transmitted to the wheels, and the minute vibration is applied in a width direction of the wheels. The wheels to which the minute vibration is applied have an increased friction coefficient in a rotation direction with respect to the road surface, and the idling of the wheels is prevented. In the differential apparatus of the related art, by increasing the biasing force of the biasing member, that is, the initial torque, the range of the differential limiting characteristic can be expanded. However, if the initial torque is excessively increased, differential rotation between the left and right wheels is likely to be absorbed, increasing the traveling resistance, making it difficult for a vehicle to turn and reducing turning performance.

On the other hand, in the differential apparatus 1, the first planar portion 39 and the second planar portion 41 are provided between the differential case 7 and the side gears 13, 15. The first abutment force, which is an initial torque, is applied between the first planar portion 39 and the second planar portion 41 by the biasing member 43. The meshing reaction force between the pinion gear 11 and the side gears 13, 15 applies the second abutment force between the first planar portion 39 and the second planar portion 41. The first planar portion 39 and the second planar portion 41 to which the second abutment force is applied can obtain the differential limiting characteristic of limiting the differential of the differential mechanism 3 (the pair of side gears 13, 15) by a sliding movement against each other. Therefore, the first abutment force of the biasing member 43 may be adjusted in accordance with a desired differential limiting characteristic, and the initial torque does not become too high. Therefore, the differential limiting characteristic does not become too high, and the turning performance of the vehicle can be maintained while preventing the idling of the wheels, thereby improving the off-road performance of the vehicle.

In the differential limiting portion 5, the first abutment force by the biasing member 43 is input from the second planar portion 41 to the first planar portion 39, and the second abutment force by the meshing reaction force is input from the first planar portion 39 to the second planar portion 41. Therefore, since directions in which the initial torque and the torque-sensitive differential limiting characteristic are generated are opposite to each other in the rotation axis direction, stable performance utilizing the respective characteristics can be obtained.

A friction member 59 may be provided on a surface of at least one of the first planar portion 39 and the second planar portion 41 (here, the second planar portion 41). By providing the friction member 59 between the first planar portion 39 and the second planar portion 41, a friction characteristic between the first planar portion 39 and the second planar portion 41 is stabilized and the wear is reduced, and thus the differential limiting characteristic is stabilized. The friction member 59 may be integrally fixed to the first planar portion 39.

An oil groove is provided on a surface of at least one of the first planar portion 39 and the second planar portion 41. In an example of FIG. 1, the oil groove 48 is provided on the second planar portion. The lubricating oil flowing into the differential case 7 flows through the oil groove. By providing the oil groove between the first planar portion 39 and the second planar portion 41, the friction characteristic between the first planar portion 39 and the second planar portion 41 can be stabilized and the wear can be reduced, and the differential limiting characteristic is stabilized. The oil groove may be provided on a surface of the friction member 59 that is directly or indirectly integrally fixed to the second planar portion 41 or the first planar portion 39.

Here, the differential limiting characteristic of the differential limiting portion 5 is evaluated by a torque ratio (torque bias ratio: TBR) of the pair of side gears 13, 15. The TBR is represented as a ratio between a torque at low revolutions and a torque at high revolutions. A locking rate of the differential limiting portion 5 required to achieve a target TBR is obtained by a formula $(TBR-1)/(TBR+1)$. A clutch torque of the differential limiting portion 5 can be obtained by a formula $T \times C$, where $T$ is an input torque and $C$ is the locking rate of the differential limiting portion 5.

For example, in the differential limiting portion 5, it is assumed that two sliding surfaces that slide against each other are conical sliding surfaces that are inclined so as to intersect the rotation axis. The conical sliding surfaces receive too much of the second abutment force due to the meshing reaction force between the pinion gear 11 and the side gears 13, 15 implemented by bevel gear sets, and the TBR (differential limiting characteristic) becomes excessively high. If the TBR becomes too high, the first abutment force of the biasing member 43 as the initial torque also needs to be increased.

On the other hand, in the differential limiting portion 5, the first planar portion 39 and the second planar portion 41 that slide against each other are sliding surfaces orthogonal to the rotation axis, and the TBR (differential limiting characteristic) does not become too high. Therefore, the first abutment force of the biasing member 43 is not excessively increased, and there is no need to excessively increase the differential limiting characteristic of the differential limiting portion 5.

Figure 3:
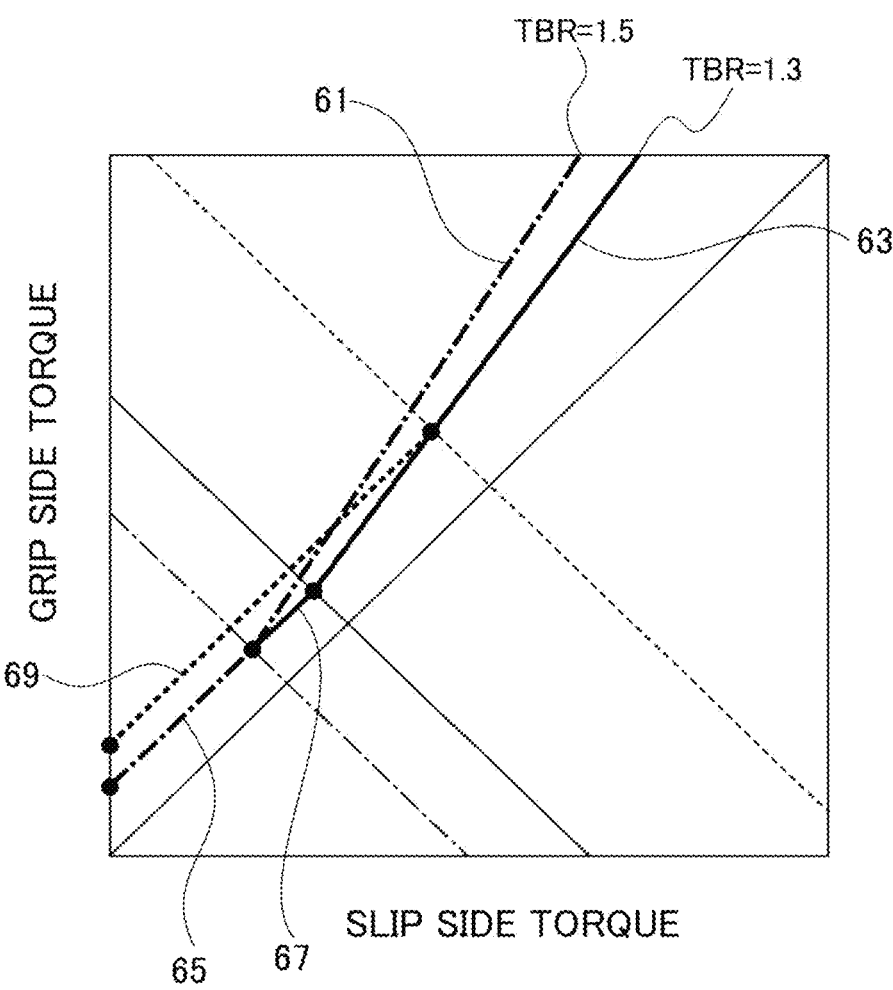
FIG. 3 is a characteristic diagram illustrating a torque characteristic of the differential apparatus according to the first embodiment, a torque characteristic of a comparative example, and an initial torque.

Here, FIG. 3 illustrates a characteristic diagram of a torque characteristic 61 of the differential limiting portion 5 of the present embodiment and a torque characteristic 63 of a differential limiting portion as a comparative example. In the differential limiting portion 5 of the embodiment, the TBR obtained by a sliding friction force between the first planar portion 39 and the second planar portion 41, which are set according to the embodiment and slide against each other, is set to 1.5, and in the differential limiting portion of the comparative example, the TBR obtained by a sliding friction inside a differential apparatus using a general bevel gear is set to 1.3. FIG. 3 illustrates an initial torque 65 of the differential limiting portion 5 of the embodiment, an initial torque 67 of the differential limiting portion of the comparative example, and an initial torque 69 when the initial torque is increased. The initial torques of the differential limiting portion 5 of the embodiment and the differential limiting portion of the comparative example are set to the same value.

As is clear from FIG. 3, it can be seen that a larger effect can be obtained when the initial torques are set to the same value and the TBR is set to 1.5 than when the initial torque is increasing to expand the effective range. In addition, there is no side effect such as a vehicle becoming more difficult to turn. On the other hand, when only the initial torque is increased as in the case of the initial torque 69, a side effect is likely to occur in which the turning performance deteriorates such as a vehicle becoming more difficult to turn at a low torque.

The differential apparatus 1 described above includes a differential case 7 that is rotatably disposed and pinion gears 11 that are rotatably supported in the differential case 7 and revolve as the differential case 7 rotates. The differential apparatus 1 also includes a pair of side gears 13, 15 that respectively mesh with the pinion gears 11 and that are relatively rotatable to each other. The pinion gears 11 and the side gears 13, 15 are bevel gear sets. First planar portions 39 orthogonal to a rotation axis are provided on respective back surface sides of gear portions of the side gears 13, 15. The differential case 7 is provided with second planar portions 41 that are orthogonal to the rotation axis and are disposed to face the respective first planar portions 39 so as to be able to abut against the first planar portions 39. A first abutment force is applied between the first planar portion 39 and the second planar portion 41 by a biasing member 43. A meshing reaction force between the pinion gears 11 and the side gears 13, 15 applies a second abutment force between the first planar portion 39 and the second planar portion 41.

The first planar portion 39 and the second planar portion 41 to which the second abutment force is applied can obtain a differential limiting characteristic of limiting the differential of the pair of side gears 13, 15 by a sliding movement against each other. Therefore, the first abutment force of the biasing member 43 may be adjusted in accordance with a desired differential limiting characteristic, and an initial torque does not become too high. Therefore, the differential limiting characteristic does not become too high, and the turning performance of a vehicle can be maintained while preventing the idling of wheels, thereby improving the off-road performance of the vehicle. Since the first planar portion 39 and the second planar portion 41 are sliding surfaces orthogonal to the rotation axis, the differential limiting characteristic does not become too high. Therefore, the first abutment force of the biasing member 43 is not excessively increased, and there is no need to excessively increase the differential limiting characteristic.

Therefore, with the differential apparatus 1 described above, it is possible to improve the off-road performance while maintaining the turning performance.

The second planar portion 41 is provided on a plate 45 disposed to be rotatable integrally with the differential case 7. On an inner diameter side of the first planar portion 39 and the second planar portion 41, a connecting portion 51 that connects the differential case 7 and the plate 45 such that the differential case 7 and the plate 45 can integrally rotate is disposed.

By providing the second planar portion 41 on the plate 45, the second planar portion 41 can be designed independently of the design of the differential case 7. The connecting portion 51 is disposed on the inner diameter side of the first planar portion 39 and the second planar portion 41. Therefore, the connecting portion 51 does not protrude outward in a radial direction, and the differential case 7 can be downsized in the radial direction.

The biasing member 43 is formed as a member that is continuous with the plate 45, and a pressing portion 53 that applies the first abutment force is disposed on an outer diameter side of the connecting portion 51.

Therefore, the first abutment force can be applied between the first planar portion 39 and the second planar portion 41 by the biasing member 43 formed as a member that is continuous with the plate 45. In addition, the number of components can be reduced.

The inner diameter side of an inner end portion of the first planar portion 39 is disposed apart from the second planar portion 41 in a rotation axis direction.

Therefore, the inner diameter side of the inner end portion of the first planar portion 39 does not slide against the second planar portion 41, and does not affect the differential limiting characteristic.

The plate 45 is provided with openings 47 penetrating in the rotation axis direction.

Therefore, a lubricating oil can be easily supplied to the second planar portion 41, and lubrication can be improved.

A block member 29 is disposed between the pair of side gears 13, 15. The first abutment force of the biasing member 43 acts on the pair of side gears 13, 15 via the block member 29.

Since the first abutment force of the biasing member 43 is received by the block member 29, backlash in the pinion gears 11 and the gear portions of the side gears 13, 15 can be ensured. The first abutment force by the biasing member 43 is input from the second planar portion 41 to the first planar portion 39, and the second abutment force by the meshing reaction force is input from the first planar portion 39 to the second planar portion 41. Therefore, since directions in which the initial torque and the differential limiting characteristic are generated are opposite to each other in the rotation axis direction, stable performance utilizing the respective characteristics can be obtained.

A friction member 59 is provided on a surface of at least one of the first planar portion 39 and the second planar portion 41.

Therefore, a friction characteristic between the first planar portion 39 and the second planar portion 41 can be stabilized, the wear can be reduced, and the differential limiting characteristic can be stabilized.

An oil groove is provided on a surface of at least one of the first planar portion 39 and the second planar portion 41.

Therefore, the friction characteristic between the first planar portion 39 and the second planar portion 41 can be stabilized, the wear can be reduced, and the differential limiting characteristic can be stabilized.

Second Embodiment

A second embodiment will be described with reference to FIG. 4.

In a differential apparatus 101 according to the second embodiment, a biasing member 103 is disposed between at least one of the pair of side gears 13, 15 and the block member 29.

The same configurations as those of the first embodiment are denoted by the same reference numerals, and the description of the functions will be omitted with reference to the first embodiment, but since the configurations are the same, the actions and effects obtained are the same.

Figure 4:
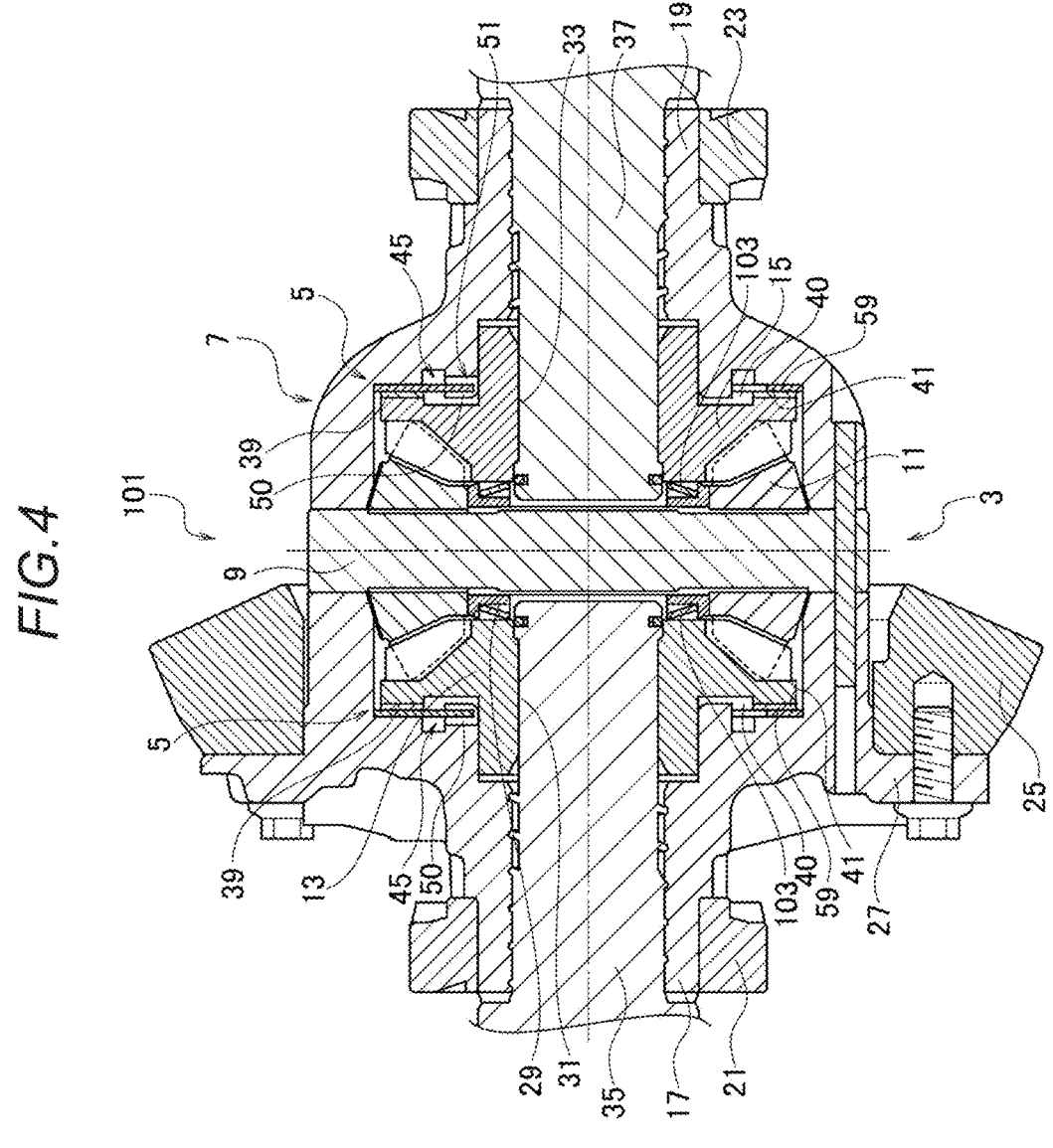
FIG. 4 is a cross-sectional view of a differential apparatus according to a second embodiment.

As illustrated in FIG. 4, the biasing member 103 is constituted by a disc spring. The biasing member 103 is disposed between the pair of side gears 13, 15 and the block member 29 in a rotation axis direction. The biasing member 103 is supported by the block member 29 in a radial direction. The biasing member 103 biases the side gears 13, 15 toward an inner surface side of the differential case 7, and applies a first abutment force, which is an initial torque, between the first planar portion 39 and the second planar portion 41. The first abutment force by the biasing member 103 is input from the first planar portion 39 to the second planar portion 41. On the other hand, a second abutment force due to a meshing reaction force is input from the first planar portion 39 to the second planar portion 41. Therefore, since the initial torque and the differential limiting characteristic are generated in the same direction in the rotation axis direction, a large TBR (differential limiting characteristic) can be generated with a small biasing force of the biasing member 103.

In the differential apparatus 101 described above, the biasing member 103 is disposed between at least one of the pair of side gears 13, 15 and the block member 29. Each plate 45 forming the second planar portion 41 provided to face the first planar portion 39 of the pair of side gears 13, 15 is disposed separately from the biasing member 103 as described above. Therefore, the plate 45 can be formed of a flat plate having a planar shape, and the structure on the inner surface side of the differential case 7 can be prevented from becoming complicated.

The first abutment force by the biasing member 103 is input from the first planar portion 39 to the second planar portion 41, and the second abutment force due to the meshing reaction force is input from the first planar portion 39 to the second planar portion 41. Therefore, since the initial torque and the differential limiting characteristic are generated in the same direction in the rotation axis direction, a large differential limiting characteristic can be generated with a small biasing force of the biasing member 103.

Third Embodiment

A third embodiment will be described with reference to FIG. 5.

In a differential apparatus 201 according to the third embodiment, a biasing member 203 is disposed between the differential case 7 and the plate 45 and is supported by the differential case 7 in a radial direction.

The same configurations as those of the other embodiments are denoted by the same reference numerals, and the description of the functions will be omitted with reference to the other embodiments, but since the configurations are the same, the actions and effects obtained are the same.

Figure 5:
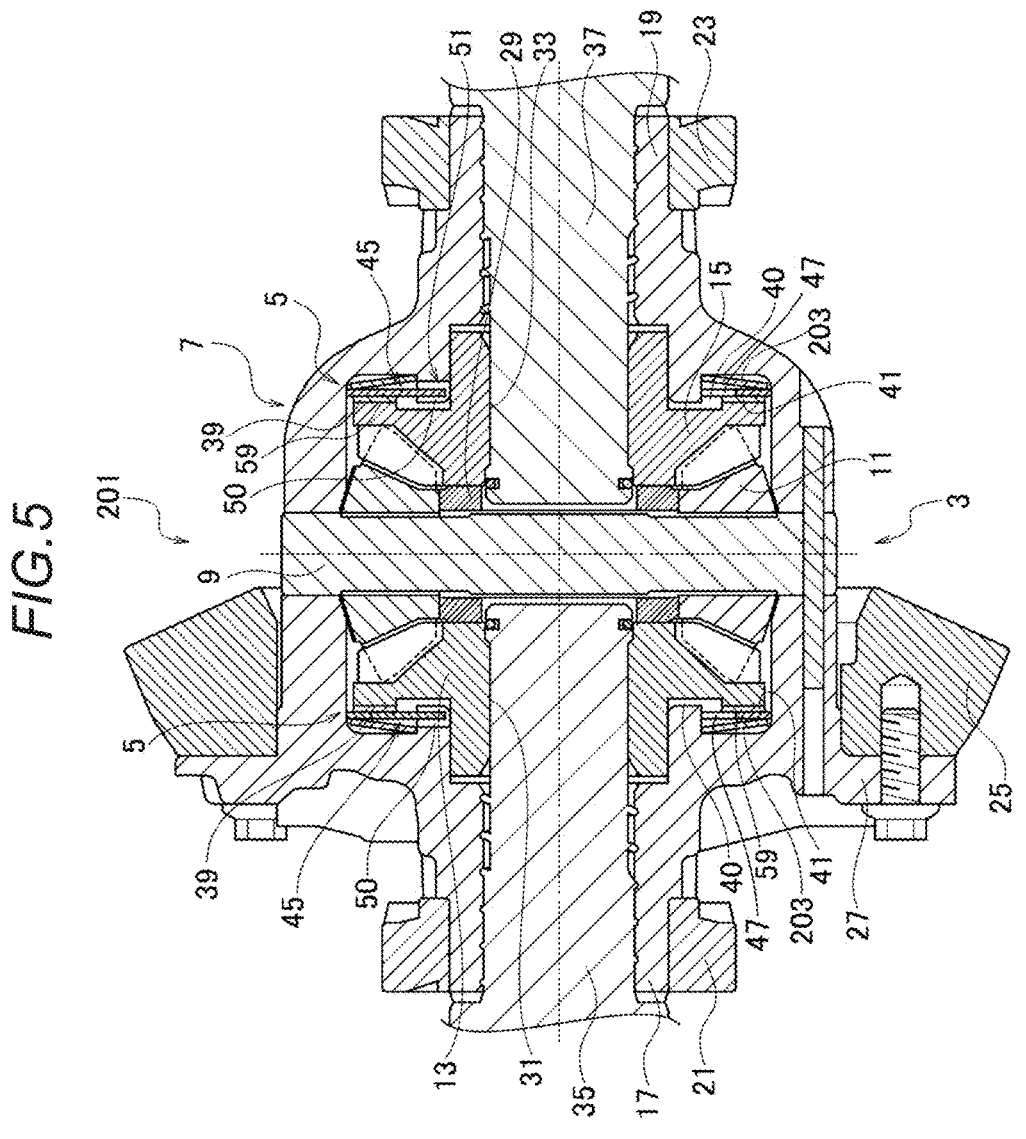
FIG. 5 is a cross-sectional view of a differential apparatus according to a third embodiment.

As illustrated in FIG. 5, the biasing member 203 is implemented by a disc spring. The biasing member 203 is disposed between the differential case 7 and the flat plate 45, which has a planar shape and is located on back surface sides of gear portions of the pair of side gears 13, 15, in a rotation axis direction. The biasing member 203 is supported in the radial direction at a portion where an inner diameter side thereof is located on an outer diameter side of the connecting portion 51 of the differential case 7. The biasing member 203 may be supported in the radial direction with respect to the plate 45, and an outer diameter side thereof may be supported by the differential case 7. The biasing member 203 biases the plate 45 toward the side gears 13, 15 and applies a first abutment force, which is an initial torque, between the first planar portion 39 and the second planar portion 41. The first abutment force by the biasing member 203 is input from the second planar portion 41 to the first planar portion 39. On the other hand, a second abutment force due to a meshing reaction force is input from the first planar portion 39 to the second planar portion 41. Therefore, since directions in which the initial torque and a differential limiting characteristic are generated are opposite to each other in a rotation axis direction, stable performance utilizing the respective characteristics can be obtained. By forming the biasing member 203 separately from the plate 45, the plate 45 provided with the second planar portion 41 and the biasing member 203 that applies the first abutment force can be designed independently. Therefore, the structure is simplified, the degree of freedom in design is improved, the setting and changing of characteristics are easy, and the configuration can be made at low costs.

In the differential apparatus 201 described above, the biasing member 203 is disposed between the differential case 7 and the plate 45 and is supported by the differential case 7 in the radial direction. Each plate 45 forming the second planar portion 41 provided to face the first planar portion 39 of the pair of side gears 13, 15 is disposed separately from the biasing member 103 as described above. Therefore, the plate 45 can be formed of a flat plate having a planar shape, and the structure on an inner surface side of the differential case 7 can be prevented from becoming complicated. The plate 45 is provided with an opening 47. The function of the opening 47 is the same as that of the first embodiment.

By forming the biasing member 203 separately from the plate 45, the plate 45 provided with the second planar portion 41 and the biasing member 203 that applies the first abutment force can be designed independently. Therefore, the structure is simplified, the degree of freedom in design is improved, the setting and changing of characteristics are easy, and the configuration can be made at low costs. If a position of abutment of the biasing member 203 with the differential case 7 is appropriately set at a location opposite to a pressing side of the plate 45, the deflection of the biasing member 203 can be controlled, and a value of the initial torque and the differential limiting characteristic can be easily managed. For the appropriate setting, another member such as the annular fulcrum member 57 of the first embodiment may be disposed, or a protrusion or a flat surface may be formed on the biasing member 203 or the differential case 7.

Although specific embodiments have been described above, embodiments is not limited thereto, and various modifications can be made within the scope of the gist of embodiments.

For example, an oil groove is provided in the first planar portion and a friction member is provided in the second planar portion, but the present invention is not limited thereto. The friction member and the oil groove may be combined in any manner, such as providing the friction member or the oil groove in both of the first planar portion and the second planar portion, or providing the friction member or the oil groove in only one of the first planar portion and the second planar portion.

As the biasing member, a disc spring which is space efficient in terms of a biasing force thereof is used, but other elements can also be used in consideration of the shape and number thereof as appropriate as long as these elements are components having a function of applying the biasing force. In this case, in terms of an arrangement relation with the differential case, it is possible to appropriately select an engagement position or an engagement means such as protrusions and recesses, holes, adhesion, welding, or engagement using a fixing member in consideration of the structure of the differential case.

All terms used in the claims are intended to be given their broadest reasonable constructions and their ordinary meanings as understood by those skilled in the art unless an explicit indication to the contrary in made herein. In particular, use of the singular articles such as "a," "the," "said,"

etc. should be read to recite one or more of the indicated elements unless a claim recites an explicit limitation to the contrary. In the preceding description, various operating parameters and components are described for one or more embodiments. These specific parameters and components are included as examples and are not meant to be limiting.

Reference in the preceding description to "one example," "an example," "one embodiment," or "an embodiment", means that a particular feature, structure, or characteristic described in connection with the example is included in at least one example or implementation including one or more but not necessarily all innovative features or components. References to various examples, embodiments or implementations do not necessarily refer to the same example, embodiment or implementation each time it appears.

What is claimed is:

1. A differential apparatus comprising:
a differential case that is rotatably disposed;
a pinion gear that is rotatably supported in the differential case and revolves as the differential case rotates; and
a pair of side gears that respectively mesh with the pinion gear, and the pair of side gears being relatively rotatable with each other,
wherein the pinion gear and the side gears are bevel gear sets,
wherein a first planar portion orthogonal to a rotation axis is provided on a back surface side of a gear portion of each of the side gears,
wherein a second planar portion orthogonal to the rotation axis and disposed to face the first planar portion so as to be able to abut against the first planar portion is provided in the differential case,
wherein a first abutment force is applied between the first planar portion and the second planar portion by a biasing member,
wherein a meshing reaction force between the pinion gear and the side gear applies a second abutment force between the first planar portion and the second planar portion,
wherein the second planar portion is provided on a plate disposed so as to be integrally rotatable with the differential case,
wherein a connecting portion that connects the differential case and the plate such that the differential case and the plate can integrally rotate is disposed on an inner diameter side of the first planar portion and the second planar portion, and
wherein the connecting portion includes an engagement protrusion that is provided on the plate and protrudes toward the inner diameter side and an engagement recess that is provided on the differential case and with which the engagement protrusion engages.

2. The differential apparatus according to claim 1, wherein the biasing member is continuous with the plate, and the plate and the biasing member form a single component, and
wherein a pressing portion that applies the first abutment force is disposed on an outer diameter side of the connecting portion.

3. The differential apparatus according to claim 1, wherein an inner diameter side of an inner end portion of the first planar portion is disposed apart from the second planar portion in a rotation axis direction.

4. The differential apparatus according to claim 1, wherein the plate is provided with an opening penetrating in a rotation axis direction.

5. The differential apparatus according to claim 1, wherein a friction member is provided on a surface of at least one of the first planar portion and the second planar portion.

6. The differential apparatus according to claim 1, wherein an oil groove is provided on a surface of at least one of the first planar portion and the second planar portion.

7. A differential apparatus comprising:
a differential case that is rotatably disposed;
a pinion gear that is rotatably supported in the differential case and revolves as the differential case rotates; and
a pair of side gears that respectively mesh with the pinion gear, and the pair of side gears being relatively rotatable with each other,
wherein the pinion gear and the side gears are bevel gear sets,
wherein a first planar portion orthogonal to a rotation axis is provided on a back surface side of a gear portion of each of the side gears,
wherein a second planar portion orthogonal to the rotation axis and disposed to face the first planar portion so as to be able to abut against the first planar portion is provided in the differential case,
wherein a first abutment force is applied between the first planar portion and the second planar portion by a biasing member,
wherein a meshing reaction force between the pinion gear and the side gear applies a second abutment force between the first planar portion and the second planar portion,
wherein the second planar portion is provided on a plate disposed so as to be integrally rotatable with the differential case,
wherein a connecting portion that connects the differential case and the plate such that the differential case and the plate can integrally rotate is disposed on an inner diameter side of the first planar portion and the second planar portion, and
wherein the biasing member is disposed between the differential case and the plate.

8. The differential apparatus according to claim 7, wherein an inner diameter side of an inner end portion of the first planar portion is disposed apart from the second planar portion in a rotation axis direction.

9. The differential apparatus according to claim 7, wherein the plate is provided with an opening penetrating in a rotation axis direction.

10. The differential apparatus according to claim 7, wherein a friction member is provided on a surface of at least one of the first planar portion and the second planar portion.

11. The differential apparatus according to claim 7, wherein an oil groove is provided on a surface of at least one of the first planar portion and the second planar portion.

12. A differential apparatus comprising:
a differential case that is rotatably disposed;
a pinion gear that is rotatably supported in the differential case and revolves as the differential case rotates; and
a pair of side gears that respectively mesh with the pinion gear, and the pair of side gears being relatively rotatable with each other,
wherein the pinion gear and the side gears are bevel gear sets,
wherein a first planar portion orthogonal to a rotation axis is provided on a back surface side of a gear portion of each of the side gears, wherein a second planar portion orthogonal to the rotation axis and disposed to face the first planar portion so as to be able to abut against the first planar portion is provided in the differential case, wherein a first abutment force is applied between the first planar portion and the second planar portion by a biasing member, wherein a meshing reaction force between the pinion gear and the side gear applies a second abutment force between the first planar portion and the second planar portion, wherein a block member is disposed between the pair of side gears, wherein the block member is configured so that the first abutment force of the biasing member acts on the pair of side gears via the block member, and wherein the biasing member is disposed between at least one of the pair of side gears and the block member.

13. The differential apparatus according to claim 12, wherein an inner diameter side of an inner end portion of the first planar portion is disposed apart from the second planar portion in a rotation axis direction.

14. The differential apparatus according to claim 12, wherein the plate is provided with an opening penetrating in a rotation axis direction.

15. The differential apparatus according to claim 12, wherein a friction member is provided on a surface of at least one of the first planar portion and the second planar portion.

16. The differential apparatus according to claim 12, wherein an oil groove is provided on a surface of at least one of the first planar portion and the second planar portion.

* * * * *